(12) United States Patent
Kristiansson et al.

(10) Patent No.: US 8,943,053 B2
(45) Date of Patent: Jan. 27, 2015

(54) SOCIAL DATA RANKING AND PROCESSING

(75) Inventors: Johan Kristiansson, Luleå (SE); Josef Hallberg, Luleå (SE); Juwel Rana, Luleå (SE); Kåre Synnes, Gammelstad (SE); Stefan Håkansson, Luleå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 557 days.

(21) Appl. No.: 12/979,493

(22) Filed: Dec. 28, 2010

(65) Prior Publication Data
US 2011/0213785 A1  Sep. 1, 2011

Related U.S. Application Data

(60) Provisional application No. 61/308,361, filed on Feb. 26, 2010.

(51) Int. Cl.
| | |
|---|---|
| *G06F 17/30* | (2006.01) |
| *G06Q 10/10* | (2012.01) |
| *G06Q 30/02* | (2012.01) |
| *G06Q 50/00* | (2012.01) |
| *H04L 29/08* | (2006.01) |

(52) U.S. Cl.
CPC .......... *G06Q 30/02* (2013.01); *G06F 17/30029* (2013.01); *G06Q 50/01* (2013.01); *G06Q 10/10* (2013.01); *H04L 67/24* (2013.01); *H04L 67/22* (2013.01); *H04L 67/2819* (2013.01)
USPC .......................................... 707/732; 715/319

(58) Field of Classification Search
USPC .......................................... 707/732; 705/319
See application file for complete search history.

(56) References Cited

U.S. PATENT DOCUMENTS

2003/0158855 A1* 8/2003 Farnham et al. ............... 707/102
2005/0203929 A1* 9/2005 Hazarika et al. .............. 707/100

(Continued)

OTHER PUBLICATIONS

Dudarenko et al., Ranking Algorithm by Contacts Priority for Social Communication Systems, NEW2AN ruSMART 2010, LNCS 6294, pp. 39-49, Aug. 2010.*

(Continued)

*Primary Examiner* — William Spieler
(74) *Attorney, Agent, or Firm* — Patent Portfolio Builders PLLC

(57) ABSTRACT

Social networking services, such as Facebook, Twitter, MySpace and Orkut, are changing our communication habits by introducing new tools that simplify and increase on-line interaction. The exemplary embodiments present methods for measuring the social strength among contacts on the basis of users' on-line interactions, which may be significantly used in real-time collaborative task management (e.g., inviting contacts for collaboration, selecting suitable tools for communication, prioritizing information flow). Moreover, exemplary embodiments provide a framework for developing new mobile social networking applications (social search client, smart dialer or contact applications) by extending the use of social ranking of contacts. Exemplary embodiments aggregate contact information from different communication sources and then harness the interaction patterns together with social strength between contacts, for instance by using communication history (interaction logs) and process mining techniques, to build an aggregated social graph that describes a user's communication habit.

28 Claims, 9 Drawing Sheets

(56) References Cited

U.S. PATENT DOCUMENTS

| | | | |
|---|---|---|---|
| 2007/0083536 A1* | 4/2007 | Darnell et al. | 707/101 |
| 2007/0174304 A1* | 7/2007 | Shrufi et al. | 707/100 |
| 2010/0161369 A1* | 6/2010 | Farrell et al. | 705/8 |

OTHER PUBLICATIONS

Tan et al., Introduction to Data Mining, 2005 (retrieved Jun. 19, 2014 from http://www-users.cs.umn.edu/~kumar/dmbook/ch8.pdf).*

Rana, J., et al., "Enriching and Simplifying Communication by Social Prioritization," 2010 International Conference on Advances in Social Networks Analysis and Mining, IEEE, 978-0-7695-4138-09/10, pp. 336-340.

Ankolekar, A., et al., "Friendlee: A Mobile Application for Your Social Life," MobileHCI'09, Sep. 15-18, 2009, Bonn, Germany, ACM 978-1-60558-281-8, pp. 1-4.

* cited by examiner

SOCIAL DATA RANKING AND PROCESSING

TECHNICAL FIELD

The present invention relates in general to social networking and, more particularly, to devices, systems, methods and software for ranking social data and applications of such processed social data.

BACKGROUND

The World Wide Web is evolving rapidly and has, over the last couple of years, shifted from being a medium, in which information is mainly transmitted and consumed, into a platform where content is created, combined and shared. Using a regular browser, users may now make online presentations, write blogs, collaborate in real-time, or share their daily life using popular social networking services. In a way, social media services have become tremendously popular by having the abilities of connecting users and communities in a collaborative way. Social media services explore the opportunities for advanced communication and also serve as an advanced content sharing mechanism. Examples include not only social networking services (SNSs), such as MySpace and Facebook, but also telecom operator's services such as messaging, photo-sharing, person-to-person as well as conference calls and even microblogging services such as Twitter.

Millions of users are actively using these communication services, exposing new trends in communication and content sharing that has not been typical in the past. Therefore, the Web is becoming a globally distributed operating system connecting everyone and everything in the whole world. Accessing this network and learning from the data, makes it possible to harness collective intelligence of the users to build even better services and tools. Despite the large quantity and popularity of social media services, it is observed that users are overloaded with huge volumes of information with the huge number of communications tools, with the huge number of communication services and with becoming a part of a multi-million number user network with the corresponding risk of positioning oneself in unexpected communities.

Accordingly, a large challenge is posed to simplify communications using Web-based communication tools given the existence of information and contact overload. To address this problem, social recommender systems aim to improve the problem of information overload for communication services' users. Such systems attempt to present the most attractive, relevant, and trust-worthy content, often using personalization techniques adapted for the specific user. Moreover, new types of recommendations emerge within social media services, such as recommendations of people, communities, tools and services to connect to, to invite, or to proceed to for real-time collaborative tasks. Due to use of such services, a tremendous amount of social data is generated as continuous data streams (e.g., Twitter). With the new trend of communication services, social data (on-line interactions) is becoming much more accessible on the cloud through different on-line social media services (e.g., on-line social networks, blogs, calendars, emails, etc.).

Social networking analysis has been a quite active research area over the last few years. Different methods related to social community discovery have been discussed. Yet these methods are not enough to directly address the problem for discovering micro-communities based on real-time interactions logs. In most of the cases, the methods use static attributes of the contact individuals. For instance, interests or professions are used as context of identifying communities. Further, an article to Ankolekar et al., discusses the idea of finding the strongest communities based on communication history. Activity oriented social networking systems collect and aggregate real-time presence status and interest from different communication services. For example, CenseMe, a personal sensing system, automatically shares presence and activity information with the contacts of different social networks.

Apart from Google's page-rank algorithm, there are some new approaches for social search techniques which typically search over a social network and rank upon analyzing social data. In these techniques, tags, bookmarks and taggers (users) are exposed as social data. Aggregation of social networks (e.g., Del.icio.us and Flickr) and Web 2.0 applications improves accuracy in social search and recommendation systems. Integration may be possible from the service owner's perspective or even from the service user's perspective. In certain literature, users' profiles are integrated in the service provider, where the chances of privacy leakage are quite high.

Thus, it will be appreciated from the foregoing that there are a number of different social networking services in existence and are also many communication services (email, phone, SMS etc.). Each user has a set of "friends", "buddies" or "contacts" for each service. There are also examples of aggregated contact lists that aggregate contacts from several sources (phone book, Facebook etc.) into one big contact list. These contact lists make it easier to contact the right person, or to respond to a contact attempt based on the fact that the person is in a user's contact list. However in such existing solutions there is no priority between contacts that would make contacting the right persons easier or would allow more efficient filtering of contact attempts.

Accordingly, it would be desirable to provide methods, devices, systems and software that would avoid the aforedescribed problems and drawbacks by, for example, capturing and analyzing communication history obtained from the Web to build enhanced social communication services.

SUMMARY

According to an exemplary embodiment, a method for providing a ranked list of a plurality of contacts based upon aggregated communication history data and contextual data, includes receiving aggregated communication history data associated with each of the plurality of contacts, wherein the aggregated communication history data for at least some of the plurality of contacts includes data from different communication services, receiving a request for the ranked list, the request including contextual data, calculating a rank for each contact based on the contextual data and that contact's aggregated communication history data, and transmitting the ranked list toward a requestor.

According to another exemplary embodiment, a method for providing a ranked list of a plurality of contacts includes receiving communication history data associated with each of the plurality of contacts, wherein the communication history data for at least one of the plurality of contacts includes data from more than one communication service, receiving a request for the ranked list, calculating a rank for each of the plurality of contacts based on the request and the communication history data, and transmitting the ranked list toward a requestor.

According to another exemplary embodiment, a computing system includes a communication history aggregator configured to aggregate communication history data associated with a plurality of contacts, wherein the aggregated communication history data for at least one of the plurality of contacts includes data from a plurality of different communication services, an aggregated social graph service configured to receive a request for a ranked list, and a social ranker configured to calculate a rank of each contact after receipt of the request for the ranked list by the aggregated social graph service, the rank being based on the request and the aggregated communication history data, wherein the ranked list is transmitted toward a requestor.

According to another exemplary embodiment, a data structure stored in a computer memory or on a computer readable storage is provided. The data structure includes a first field comprising a user identifier; a second field comprising a first contact identifier of a first contact of the user, the first contact being from a first communication service; a third field comprising a second contact identifier of a second contact of the user, the second contact being from a second communication service; a fourth field comprising a ranking of a strength of a connection between the first contact of the user and the user; and a fifth field comprising a ranking of a strength of a connection between the second contact of the user and the user.

BRIEF DESCRIPTION OF THE DRAWINGS

The accompanying drawings illustrate various aspects of exemplary embodiments which are described herein, wherein.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

According to exemplary embodiments, one way of simplifying communication is to provide a framework that may generate or discover a social graph by aggregating all of the contacts associated with individuals from different communication services and which may enable development of new communication services in a simpler and goal oriented manner. For example, these exemplary embodiments describe how communication history may be used to optimize social recommender systems to enable, e.g., easily inviting a group of users based on a specific context. Moreover, exemplary embodiments also may address the challenges of (1) how a service in the cloud may automatically build a personalized social graph in real-time by harnessing Web-based communication services, (2) how a personalized service may be able to automatically calculate social strength of contacts based on interaction logs available in the cloud, and (3) what generalized models of interaction may be used to identify user's/contact individual's communication patterns.

Figure 1:
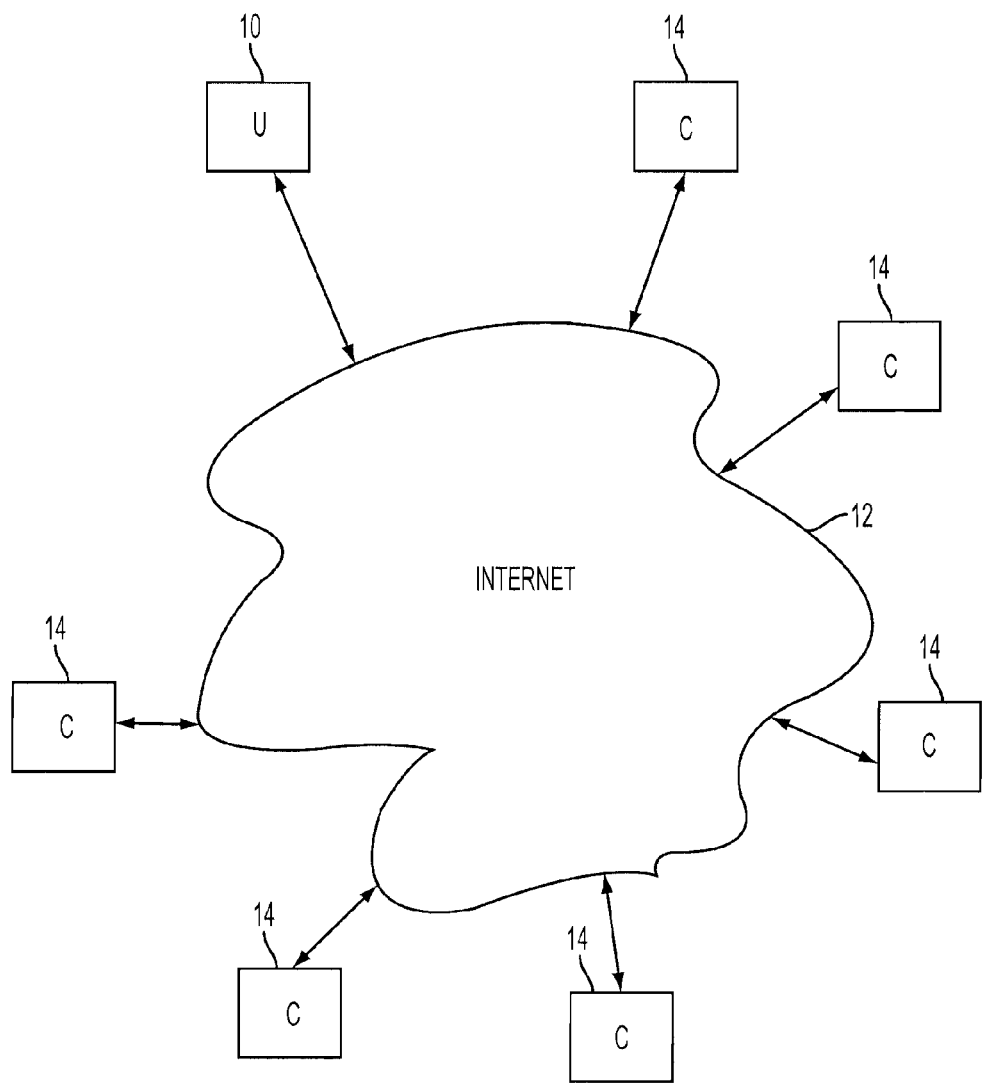
FIG. 1 is a schematic representation of network system according to an exemplary embodiment of the present invention.
Figure 9:
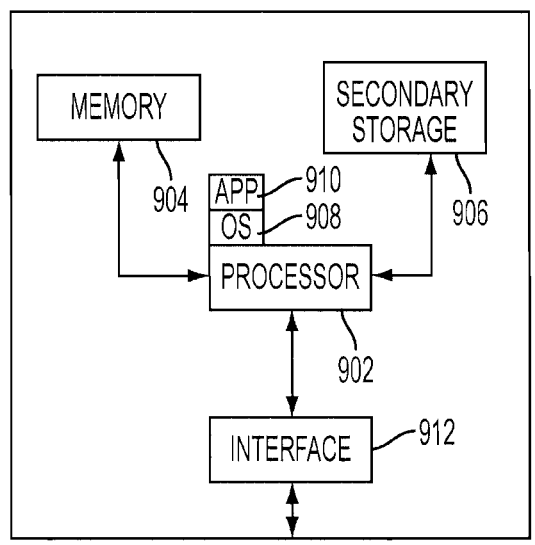
FIG. 9 is a schematic representation of a computing device according to an exemplary embodiment of the present invention.

To provide some context for the more detailed discussion of the processing of social network data and applications of the processed data, consider first the exemplary network system illustrated in FIG. 1. Therein, a given user U may be connected via a device 10 (or multiple devices 10) to a network 12, e.g., the Internet. The device 10 may be any user equipment via which the user may interact with the network 12, e.g., a personal computer, mobile phone, PDA, television, set-top box, etc., an example of which is discussed below with reference to FIG. 9. Although the Internet is used as an example of network 12, it will be appreciated by those skilled in the art that network 12 may be any network or multiple networks via which user 10 may interact with other individuals, shown as contacts 14.

According to one exemplary embodiment, a social ranking of contacts 14 may be performed using one or more of the techniques described below. Once socially ranked, the contacts 14 may then be dynamically grouped for usage, e.g., by web applications. Dynamic grouping according to some exemplary embodiments may be the process of grouping contacts, inviting contacts and finally, establishing communication among the contacts using communication tools. In addition, a dynamic group may be created by exploiting contextual data (e.g., location data, activity, interest).

Figure 2:
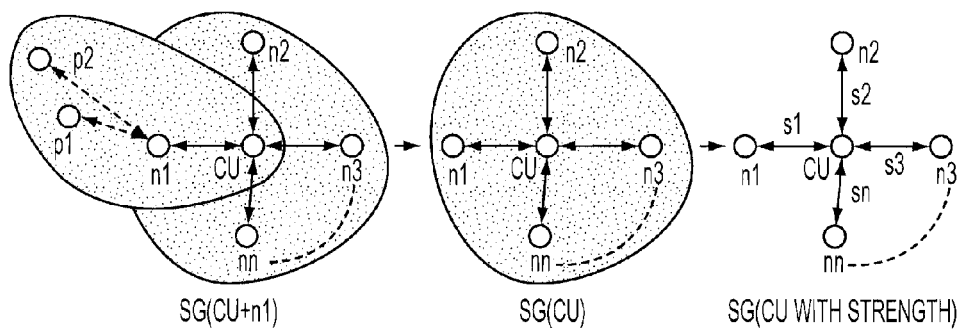
FIG. 2 is a schematic representation of a social data framework according to an exemplary embodiment of the present invention.

Starting with a discussion of social ranking of contacts 14 according to an exemplary embodiment, and with reference to the framework depicted in FIG. 2, social strength may be used as a primary parameter of measuring the depth of connectivity of a specific user U 10 with the various, identified contact individuals 14. According to this exemplary embodiment, the contacts 14 may be discovered from different communications services and may form an aggregated social graph SG of contacts, which graph may be built as a data structure in a recommender subsystem described in more detail below. For example, as shown in FIG. 2, SG(U) illustrates an exemplary aggregated social graph of user U 10 relative to various contacts 14 of that user 10. According to exemplary embodiment, this is a social graph that not only may aggregate the social connections from several sources, but also may assign them a weight (strength) based on several possible different metrics such as: frequency of communication, form of communication, contact lists, and context. This aggregated weighted social graph according to exemplary embodiments may enable a number of different functions that may make life simpler for the everyday user. For example, the aggregated weighted social graph may enable automatic presence generation. By combining, e.g., mail data, calendar data, tweets, and Facebook data, it may be possible to determine if a user is, e.g., at work, in a meeting, or on vacation. The aggregated weighted social graph may enable social filtering. Incoming requests or notifications may be filtered, and a user may be notified only of relevant requests or notifications given a current context. The aggregated weighted social graph may enable proposal of receivers or groups. Contacts may be automatically recommended for a communication attempt.

Figure 3:
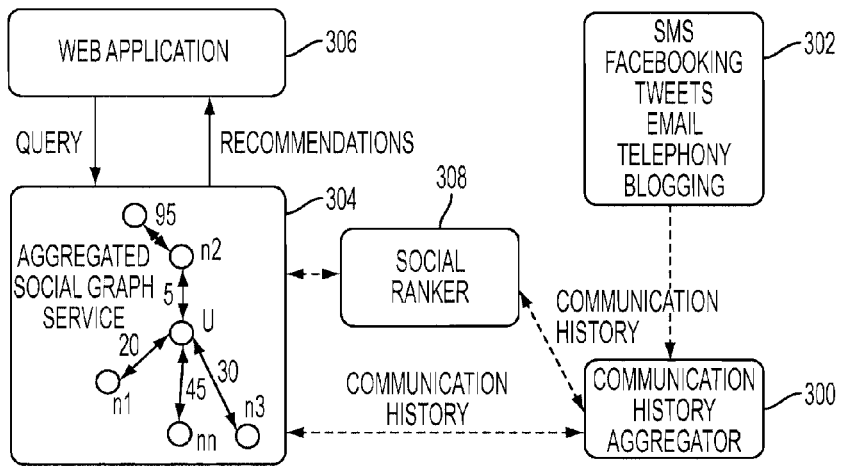
FIG. 3 is a schematic representation of a computing system according to an exemplary embodiment of the present invention.

The aggregated, weighted social graph may be constructed and employed in an exemplary system as shown in FIG. 3. Therein, a communication history aggregator component 300 may be responsible for aggregating multiple communication logs from various communication services 302 into one single communication history log. Each communication service 302 may regularly generate and send communication log data to the communication history aggregator component 300. Alternatively, a separate component may fetch data from the communication services 302 and generate a communication log. In the latter exemplary embodiment, the communication service may not have to be updated, which may be more suitable for interaction with existing services such as Facebook and Twitter.

As users may have different user names in different services, user names may be correlated in order make an aggregated communication history log. According to one exemplary embodiment, a user may be required to sign up to an aggregated social graph service and provide each of his or her identities (login names etc.) that are associated with each of the different services 302 that he or she uses. In another exemplary embodiment, the communication history aggregator 300 automatically may try to match identities and build a profile data base containing contact information for each user. For example, if a particular user has a Twitter account named "mjrana_1234523" and a Facebook account named "mjrana", the communication history aggregator 300 may assume they are the same user. The communication history aggregator 300 may also be configured to use an external search engine to resolve user identities. For example, the communication history aggregator 300 may communicate with a yellow page service to match a telephone number with a personal name or email address.

Note that it may be possible that the communication history aggregator 300 makes incorrect aggregations due to user name resolution failure. This problem may be solved (or at least recovered from) by learning from user interaction patterns or getting feedback from queries to figure out if a recommendation/decision was successful. It should be emphasized that the user may make a final decision (like with all search engines) and a purpose of the system may be to make recommendations. That is, incorrect decisions should not result in fatal errors in the end-user application using the aggregated social graph service 304.

Another feature of this exemplary embodiment may be to aggregate communication histories from various services into a unified format. This format may be based on an interaction model containing various information including, e.g., sender and receiver addresses, service, a tool type, and timestamps, as described below with respect to FIGS. 5-7.

To be able to generate the aggregated social graph, the aggregated social graph service 304 may periodically fetch aggregated communication history data from the communication history aggregator component 300. Alternatively, the communication history aggregator component 300 may send (push) the communication history data to the aggregated social graph service 304 and the aggregated social graph service 304 may use the communication history log containing sender and receiver information, to generate a user U's social graph.

When the aggregated social graph service 304 receives a query from a web application 306, it may interact with a social ranker component 308. According to this exemplary embodiment, the aggregated social graph service 304 may support three types of query requests from a web application 306, although those skilled in the art will appreciate that more or fewer types of queries are possible. One type of request may be a contacts recommendation request based on contextual data submitted in the query. This request may also be used to generate presence information about a user as the aggregated social graph also contains the latest activity such as the latest message sent and can include sources such as calendar data. A second type of request is a content or message prioritizing request based on contextual data and sender information submitted in the query. A third type of request is a filtering decisions request based on contextual data and sender information submitted in the query. Filtering decisions may be accomplished using a threshold to filter an individual message. An alternative method may be to specify how many messages should be removed from a given set of messages. The contextual filtering in this third type of request may include multiple parameters (e.g., location, activity).

When the aggregated social graph service 304 receives a query from a web application 306, the aggregated social graph service 304 may interact with the social ranker 308, which may calculate a rank of each contact associated with the content. The rank may be calculated using a social strength metric, which may be calculated based upon a communication history, e.g., using one of the algorithms described below.

In order to better understand how the system illustrated in FIG. 3 may provide real-world benefits, consider the following (purely exemplary) usage scenario. Suppose that a user, Peter, has different contacts in different communication services 302. Some of them are friends, some others are colleagues, and some others may have similar interests and so on. For example, suppose that Peter has different friends in Facebook, Twitter, and in his mobile phone's contact application. Peter uses the aggregated social graph service 304 to control his social contacts. Due to tremendous information flow from all of his communication services, he wants to have assistance to prioritize his contacts and filter information/content based on social strength and context to avoid information/content overload. He expects to have a service which keeps track of all his interactions and automatically prioritize contacts based on social strength. The system may calculate Peter's social strength based on his preferences and may infer that information for social ranking, dynamic grouping or recommending contacts.

Returning to FIG. 2, therein a general topology of an aggregated social graph SG and high level abstraction of social strength in the social graph SG is shown according to an exemplary embodiment. Social graph SG may contain a set of entities (actors/users/nodes/contact individuals) and may provide inter-relationships among those entities. For example, U, n1, p1 may be the nodes in the SG and the arrow in-between U and n1 may indicate connectivity/relationship. Here, direct connectivity may indicate direct network/social contact (e.g., first degree friends, U and n1) between two entities, while indirect connectivity may indicate indirect network/social contact (e.g., second or more degree friends, U and p1 which are connected through n1).

According to exemplary embodiments, different algorithms may be used (alternatively or jointly) for the social ranking of contacts using communication history. Conceptually, these social ranking algorithms may consider user U 10 as the "center" user. For the computation of social strength using these algorithms, first degree contacts, i.e., the individuals who are connected directly may be considered. For searching and ranking, the algorithm may use contextual data. The output of these algorithms may be a list of ranked social contacts based on context and interactions. According to a first exemplary embodiment, utility functions may be used to calculate a social ranking of contacts as shown below.

---

Algorithm 1 Social Strength Calculation Algorithm (Utility)

---

Require: $f_{i,j,k}$ and $C_k$
Ensure: $k = 1 \ldots n$
while $k \neq n$ do $$s_k = \sum_{i=1}^{p} thres_i \, s_{i,k}$$

$$= \sum_{i=1}^{p} t1 \sum_{j=1}^{q} \frac{f_{i,j,k} thres_{i,j}}{\sum_{k=1}^{n} f_{i,j,k}}$$

end while

---

Figure 4A:
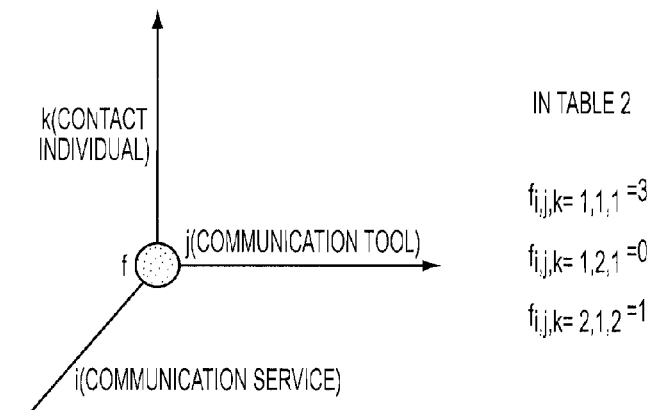
FIG. 4(a) is a schematic representation of a frequency of interactions according to an exemplary embodiment of the present invention.

Therein, C may be a set of contact individuals $\{n_1, n_2, n_3 \ldots n_n\}$ representing the social graph of user U, who may use a set of communication services S (e.g., social networks, Web 2.0 applications) $s_1, s_2, s_3 \ldots s_p$ and generate bi-directional interactions. For simplicity, the heterogeneity problem of contacts in different communication services of the user U is avoided. The heterogeneity problem may arise where the synchronization of contacts has not been performed periodically among different communication services. For these exemplary embodiments, the assumption may be that the aggregated contacts of user U may be available to all the services which are being used by the user U. Another consideration is that a single communication service may provide one or more communication tools (e.g., Facebook messaging, Facebook photo-sharing, and Facebook commenting (tools-Facebook/Message, Facebook/Photo, and Facebook/Comments)). Therefore, the set T may contain the number of tools $\{t_1, t_2, t_3 \ldots t_p\}$ used in different communication services. For example, if $s_1$ represents the Facebook service, then $t_1$ may be the number of tools associated with the Facebook service (e.g., as shown in Table 1 below in column Facebook/Message, Facebook/Photo, Facebook/Comment). Moreover, frequency $f_{i,j,k}$ in this first algorithm, may contain the number of interactions in between user U and contact k on the usage of communication tool j in communication service as shown conceptually in FIG. 4(a). In this algorithm, the overall social strength of the user U may be:

$$S = \sum_{k=1}^{n} s_k = 100$$

TABLE 1

Exemplary Frequency logs

| Name | FB/ Message (i = 1, j = 1) | FB/ Photo (i = 1, j = 2) | FB/ Comment (i = 1, j = 3) | Mobile-phone/ Call (i = 2, j = 1) | ... |
|---|---|---|---|---|---|
| Johan(k = 1) | 3 | 0 | 0 | 5 | ... |
| Stefan(k = 2) | 2 | 2 | 1 | 1 | ... |

TABLE 1-continued

Exemplary Frequency logs

| Name | FB/ Message (i = 1, j = 1) | FB/ Photo (i = 1, j = 2) | FB/ Comment (i = 1, j = 3) | Mobile-phone/ Call (i = 2, j = 1) | ... |
|---|---|---|---|---|---|
| Kare(k = 3) | 1 | 0 | 6 | 2 | |
| Josef(k = 4) | 2 | 2 | 3 | 3 | ... |
| Andrea(k = 5) | 4 | 1 | 4 | 0 | ... |
| Basel(k = 6) | 3 | 4 | 2 | 2 | ... |
| ... | ... | ... | ... | •• | ... |

In the utility based algorithm 1 embodiment, two primary equations may be used for calculating social strength. Equation (1), reproduced below, may calculate a strength of contacts on the basis of a particular communication service. That is, the first equation may determine the strength of user U among contacts C for a particular communication service s1 (e.g., Twitter). Equation (2), reproduced below, may provide an overall strength considering all communication services S. The parameter $s_{i,a}$ in Equation (1), may provide the strength of user U with the contact a, considering all the interactions which happened in communication service i. In addition, n may be the number of friends, $t_i$ may be the number of communication tools for the service i and $thres_{i,j}$ may be the threshold value of tool j in communication service i.

$$s_i \sum_{j=1}^{thres_i} \frac{f_{i,j,a} thres_{i,j}}{\sum_{k=1}^{n} f_{i,j,k}} \quad (1)$$

$$s_a = \sum_{i=1}^{p} thres_i^{s_{i,a}} \quad (2)$$

Equation (2) may collect and summarize strengths collected from S to obtain a global ranking of the contacts for user U. Here, the parameter $s_a$ may provide the overall strength of the user U with the contact a. The parameter $thres_i$, may be the threshold value estimated over the usage on communication service i. Another important factor of the utility based approach according to this exemplary embodiment may be tuning threshold values for the different communication tools and services. In this exemplary embodiment, usage of the tools and services may be taken into consideration for tuning this parameter dynamically. Two additional functions (Equation 3 and Equation 4 below) may be used to tune these thresholds. These equations may ensure that, e.g., the tools which are used more, get higher threshold values comparing with the less frequently used tools. Therefore, both of the functions may count the frequencies of usage of tools and services, e.g., an example of which is provided above in Table 1, and prioritize communication tools and services.

$$thres_{i,j} = \frac{\sum_{k=1}^{n} f_{i,j,k}}{\sum_{m=1}^{q} \sum_{k=1}^{n} f_{i,m,k}} \quad (3)$$

$$thres_i = \frac{\sum_{j=1}^{q}\sum_{k=1}^{n} f_{a,j,k}}{\sum_{m=1}^{p}\sum_{j=1}^{q}\sum_{k=1}^{n} f_{m,j,k}} \quad (4)$$

In the Equation (3) above, $thres_{i,j}$ may provide a percentage of usage of the tool j in communication service i by the user U. For instance, if there are four different tools in communication service i, then $thres_{i,j}$ may measure the ratio of usage of a particular tool. Yet $thres_{i,j}$ may not be enough according to some exemplary embodiments to estimate the overall effect of a particular communication service. Accordingly, Equation (4) may be used alternatively or in addition to Equation (3) to measure threshold for the communication sources.

In the Equation 4, $thres_i$ may provide the percentage of usage of a communication service a with respect to all interactions in all kinds of communication sources of the user U. In the utility based method according to this exemplary embodiment, calculated strength may simplify the ordering for ranking the contacts. For example, if user U has three contacts, which are A, B and C with relative strengths of 20, 50 and 30, then the rank of these contacts in descending order may be B, C and A. That is, user U may have the strongest connectivity with contact B compared with A and C. In addition, it may be possible to identify such ranking by considering all communication services or any particular communication services.

According to another exemplary embodiment, social data may be ranked using a similarity coefficient algorithm. In this approach, a technique which measures co-efficient "Euclidean distance" is used, wherein r is the radius. The assumption of this technique is that strongly connected contacts will have a shorter distance between one another as compared with the distance between more loosely connected contacts. Therefore, by measuring the distance of the contacts from the specific user U, the result may be transferred for ranking among the contacts. In this case, each of the communication tools may be considered as features, contacts may be considered as objects and frequencies may be the values of the particular features. For example, frequency $f_{i,j,k}$ may be the value of feature j of the object k in communication service i. To be aligned with classical Euclidean distance equation, $f_{i,j,k}$ may be mapped into $f_{j,k}$ [Table 2] where value may be the number of interactions of user k using communication tool j. Here, user U, may contain the maximum number of interactions (by default) for all the features.

Therefore the distance, $$d_{U,k} = \sqrt{\sum_{j=1}^{r} (f_{j,U} - f_{j,k})^2}$$

Now by inverting distance in between the user U of interest, for whom the particular SG is being generated, and contact k, the similarity may be measured, which may be interpreted as strength between user U, and contact k. Thus, the social strength of a contact k relative to a given user U may be expressed as $$s_k = \frac{1}{1 + d_{U,k}}.$$

Accordingly, this second algorithm for calculating social strength according to this exemplary embodiment may be more completely expressed as shown below.

---
Algorithm 2 Social Strength Calculation Algorithm
(based on Euclidean distance)

Require: $f_{i,j,k}$ and $C_k$
Ensure: k = 1 ... n
 while k ≠ n do $$d_{U,k} = \sqrt{\sum_{j}^{r} = 1(f_{j,U} - f_{j,k})^2}$$

$$sk = \frac{1}{1 + d_{U,k}}.$$

end while

---

Figure 4B:
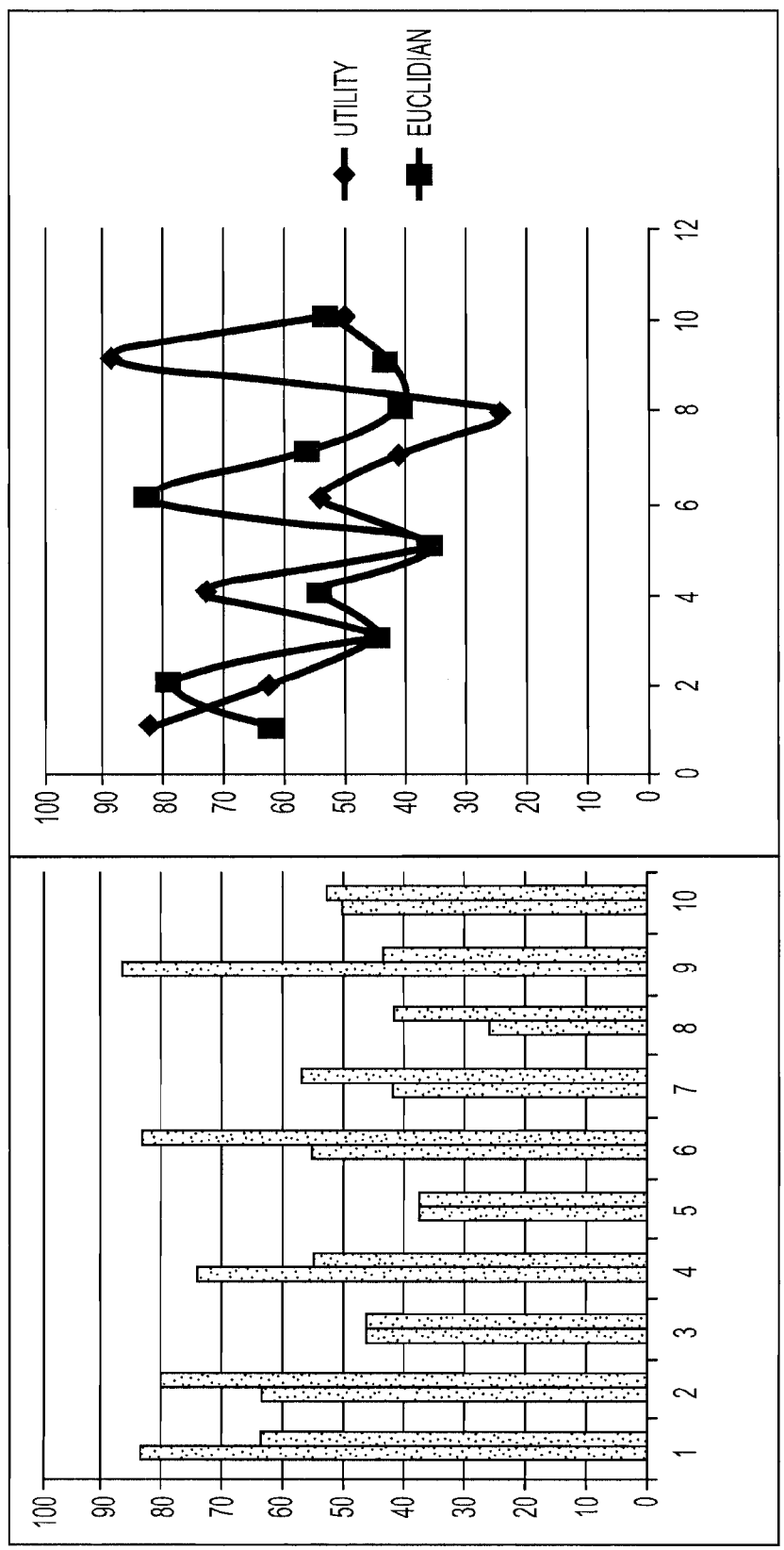
FIG. 4(b) is a schematic representation of results of calculating contact rankings according to exemplary embodiments of the present invention.

The ranking results of the two algorithms may be quite similar. However, there may be some differences because of the effect of threshold values applied in utility function based algorithm 1. On the other hand, the Euclidean distance based approach may be completely unbiased where all tools are equally weighted. The advantages of the utility based approach may be that calculated ranks may be applied to signify any particular features (i.e., communication tools) and recommendations may be made based on the interactions done by that feature. For example, measurement of the percentage of usage of Facebook may be calculated using utility-based algorithms according to these exemplary embodiments. Results of a test to compare the results of these two algorithms using the same data set are shown in FIG. 4(b) for the social rankings of ten contacts using these two exemplary algorithms. FIG. 4(b) shows the rank for ten different contacts, comparing the utility-based algorithm and the Euclidean distance based algorithm. For example, for Contact 1, the rank is 4 and for Contact 2, the rank is 3. As can been observed, the algorithms perform slightly different. This may be expected and may be the result of the use of thresholds in the utility-based algorithm. FIG. 4(b) shows that the weights for the utility-based algorithm may have a larger variance than the weights for the Euclidian algorithm, as may be expected.

Figure 5:
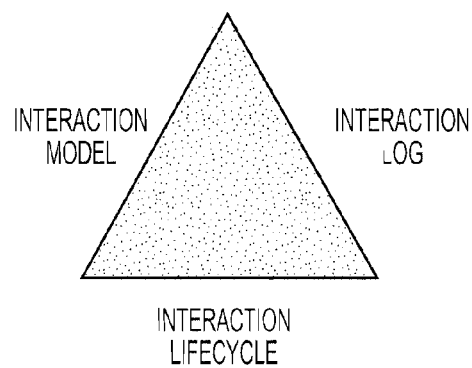
FIG. 5 is a schematic representation of stages of modeling and generating on-line interactions according to an exemplary embodiment of the present invention.

Also according to exemplary embodiments, modeling of on-line interactions may be considered as a set of techniques for transforming different interactions using a unified format. FIG. 5 depicts three stages of modeling and generating on-line interactions. Generation of on-line interactions may be used to support systems according to these exemplary embodiments by providing detailed interactions logs. The first stage may be the interaction life cycle where each of the interactions may be initiated by a user of the communication service towards a contact or a group of contacts of the same or different services. The interaction pattern model may also be designed to represent a flow of activities in interactions. The format of interaction logs may be discussed for capturing interactions from different sources for monitoring and analyzing communication history. Details of each of these steps according to exemplary embodiments are given below.

Figure 6:
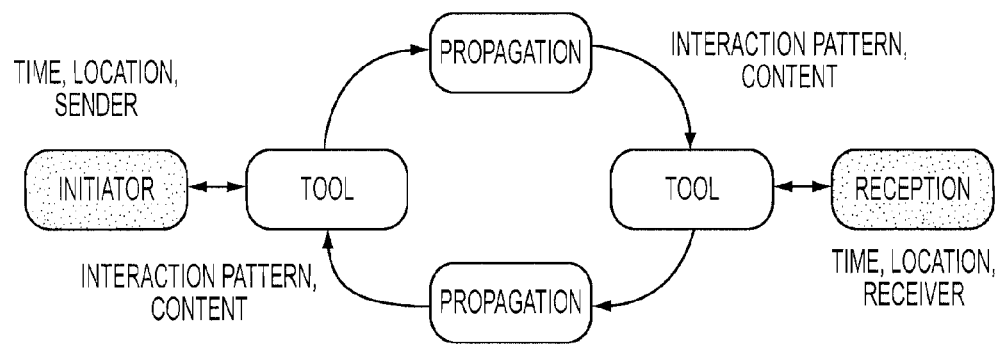
FIG. 6 is a schematic representation of an interaction lifecycle stage of interaction modeling according to an exemplary embodiment of the present invention.

For example, FIG. 6 depicts the interaction life-cycle step of on-line interaction modeling according to an exemplary embodiment. The model may generate one-to-one interaction, one-to-many interactions or bi-directional interactions which may form conversation. To segregate conversations from interaction logs, co-relation among interactions may need to be discovered. For simplicity, interaction may be considered as a unique communication unit by ignoring conversations to provide a straightforward mechanism for counting frequencies of usage of communication tools. The interaction may be initiated by the user of the service through a service client (e.g., Facebook's iPhone application). The service might be able to capture location data (with sensors associated with application carrier) and time for instance to propagate the content (e.g., picture) via a communication platform (e.g., Facebook) using a particular tool (e.g., Facebook photo-sharing). Other examples include SMS, MMS, phone calls, audio file sharing applications, video sharing applications, commenting, social tagging, tweets, and re-tweets.

The interaction pattern model stage may indicate the steps used to accomplish an interaction (e.g., initiation, tool selection, propagation, and reception). Interaction patterns may differ from platform to platform and based the on selection of tools within each platform. For example, some interactions are unidirectional which never return a reply or response. On the other hand, some interactions implicitly need confirmation, e.g., inviting colleagues to participate in meeting. For example, the public tweet and @receiver communication tools of the Twitter application are quite different. Public tweets are initiated for a group of users while @receiver is for a particular user and it might form as a conversation at the end. Moreover, the interaction patterns may be even more different when comparing different tools of different communication services for instance, in Facebook and Twitter. Thus, to discover communication interaction patterns, exemplary embodiments may use simplified on-line interaction patterns which may comply with the interaction life-cycle and, vice-versa, which are able to represent most of the communication tools.

Figure 7:
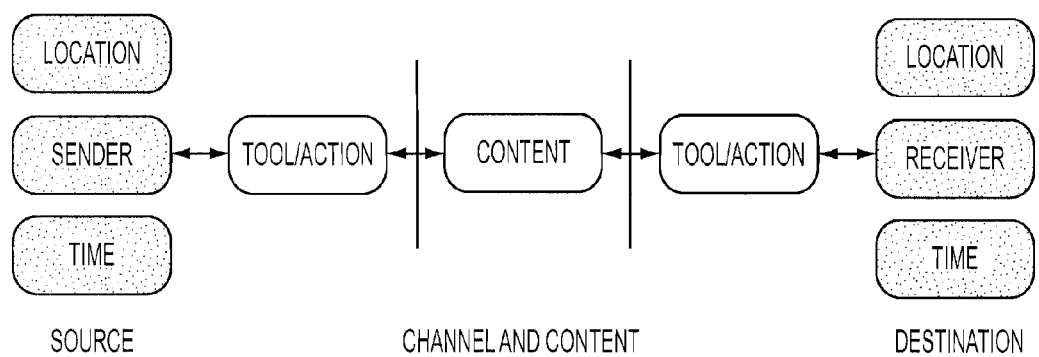
FIG. 7 is a schematic representation of communication pattern models according to an exemplary embodiment of the present invention.

FIG. 7 illustrates exemplary communication pattern models which may, for example, be easily interpreted to form Twitter messages or Facebook messages. The pattern could be also used for interpreting phone calls, SMS and MMS. Interaction patterns may inform users about their communication habits and, therefore, it may be important to identify communication patterns discovered from interaction logs for recommending better communication tools and services to specific users.

Moving to the third side of the triangle of FIG. 5, interaction logs may contain communication history of individuals. Table 2 below shows a simplified example of interaction logs including some of the basic properties/features for forming interactions. The table contains only interactions. For example, if a user replies to a corresponding message, the system may consider the follow up replies as a unique interaction. Here, the sender may contain information of a message initiator, time and location. In Table 2, Action may be the name of the tools (SMS), platform may be e.g., Facebook or Twitter, and receiver may contain the information of a receiver, time and location. From Table 2, it may be easier to measure frequency of interactions, platforms which may help to measure social strength.

TABLE 2

Sample interaction logs

| Sender | Action | Platform | Action | Receiver |
|---|---|---|---|---|
| Kare:T:Lulea | SMS | Telecom | Reply | Peter:T:St |
| Johan:T:Lulea | Phone call | Telecom operator | Rec | Peter:T:St |
| Josef:T:Lulea | Tweet | Twitter Web Application | Reply | Peter:T:St |
| Juwel:T: Stockm | SMS | Telecom operator | Reply | Peter:T:St |

From the foregoing, it will be appreciated that a number of different functions may be implemented as part of a system employed to build the afore-described aggregated, weighted social graph according to exemplary embodiments, including, for example, a data collection function to automatically collect data from different sources (phone calls, emails sent, Tweets, Facebook posts, etc.), an identity matching function to identify that, for example, a particular user abc in Twitter is in fact the person having phone number 1234, and an interaction modeling function to enable comparisons between make the different types of interaction (tweets, FB, phone conversations, etc.).

From the foregoing discussion, it will be appreciated that exemplary embodiments have a number of different applications, e.g., they may be used to create micro communities or dynamic groups based on recommendations from the system. For example, the service may send a query request asking for all colleges in Luleå relevant to a particular user, and use this information to send invitations to a shared work space where all the users may interact. Exemplary embodiments may also be used to generate presence information, for example, showing the latest tweets from Twitter. Moreover, exemplary embodiments may be used to prioritize messages or content. For example, exemplary embodiments may be used to prioritize Twitter tweets or Facebook notifications to decrease the risk of overloading the user with information. Still another application of exemplary embodiments is to decide if a particular contact attempted should be blocked, e.g., to decide if a particular Facebook notification should be presented to the user or not. Finally, the exemplary embodiments may be used to generate contextual data that may be used by other services. A change in the communication pattern (perhaps in combination with time) may for example indicate that the user has left work and is traveling home.

Additionally, from the foregoing discussion, it will further be appreciated that systems, methods, devices and software which implement these exemplary embodiments may have one or more of the following elements: a weighted, aggregated social graph or data structure built up from several sources of data (e.g., not only input graphs/contact lists but also communication patterns, usage, etc.); an interaction model that allows comparison of activity/communication pattern from different services; one or more algorithms to build a weighted aggregated social graph from the interaction model and calculate the social strength between the user and the contacts; building context and presence info from the data collected from several sources; identity matching to match contacts from different sources; a platform or service that contains the weighted aggregated social graph that provides an interface for end-user services to receive a prioritized list of relevant user based on a submitted query containing contextual data; a platform or service that contains the weighted aggregated social graph that provides an interface for end-user services to receive a prioritized/ranked list of content/messages (e.g. emails, Twitter tweets etc.) based on a submitted query containing a list of message ids and the corresponding originator; and/or a platform or service that contains the weighted aggregated social graph that provides an interface for end-user services to receive a suggestion if a particular content/contact attempt (e.g. notifications or incoming message) is relevant or not, so that the user is not disturbed unnecessarily. The weighted, aggregated social graph or data structure may have an additional context component or dimension (so that, e.g., the graph will depend on the context—likely generating different graphs during work than when free, etc.).

Figure 8:
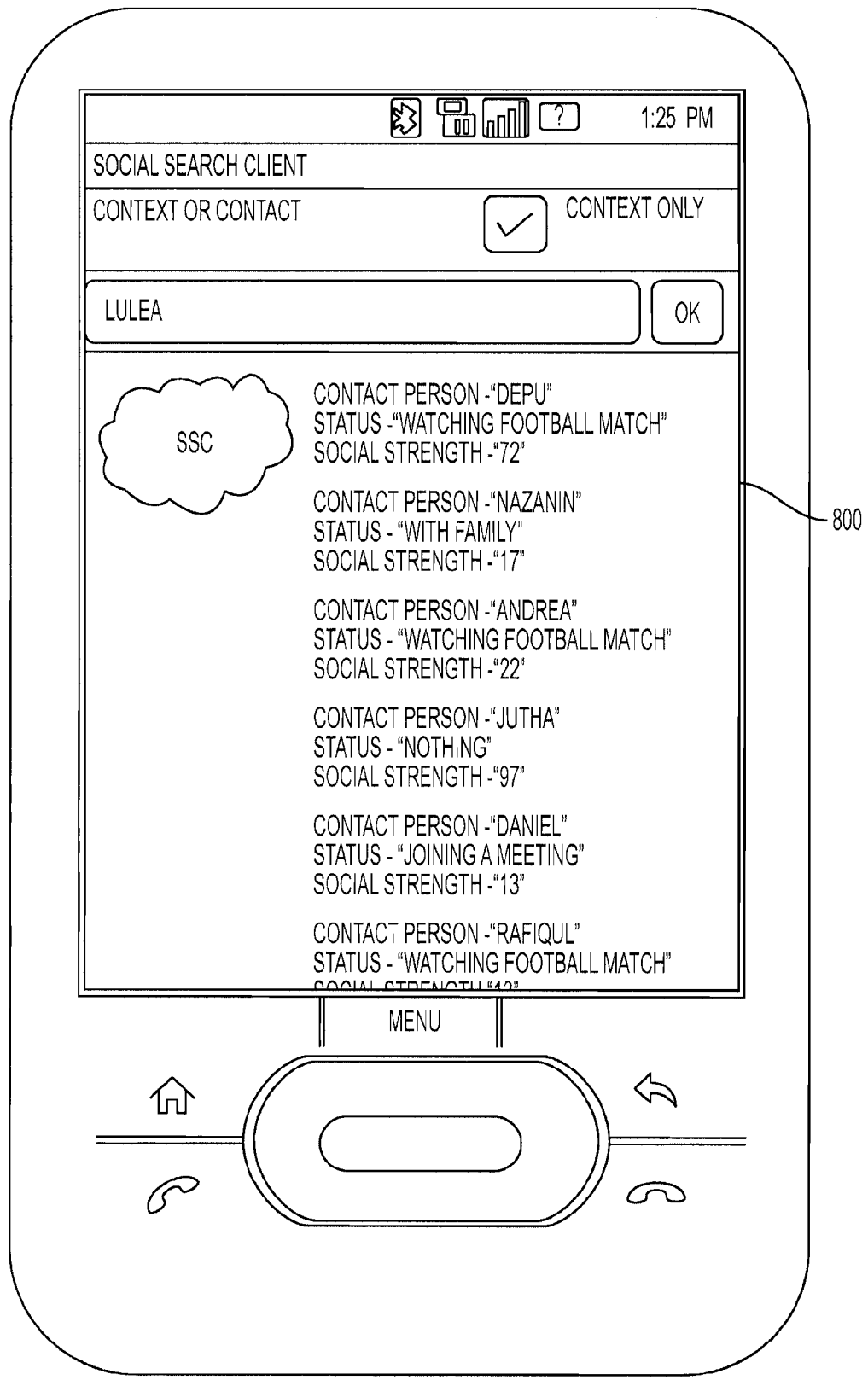
FIG. 8 is a schematic representation of a social search client according to an exemplary embodiment of the present invention.

As an output, a Web Application 304 may deliver data to, e.g., a mobile phone client application called "Social Search Client" as shown in FIG. 8 to access, e.g., the system 300 for generating dynamic groups using context as a search key.

According to this purely illustrative embodiment, the group displayed on the user interface 800 may be generated based on the strength of relationship, preferences and contexts. The contact application running on the mobile phone may update presence and other social data of the contact individuals from their social networks (specifically, Facebook and Twitter). In the current simple development of Social Search Client, it is possible to generate a dynamic group of strongest connectivity based context (for instance location). It may be seen in FIG. 8, that the end user is provided with a social strength rating and a status for each displayed contact.

As described, exemplary embodiments involve both user devices, social ranking systems which may be implemented on a server, and other network components. For example, as shown generally in FIG. 9, such devices or nodes 900 may include a processor 902 (or multiple processor cores), memory 904, one or more secondary storage devices 906 (e.g., external storage device(s)), an operating system 908 running on the processor 902 and using the memory 904, as well as a corresponding application 910, e.g., an application which handles one or more of the functions described above. An interface unit 912 may be provided to facilitate communications between the node 900 and the rest of the network or may be integrated into the processor 902.

Figure 10:
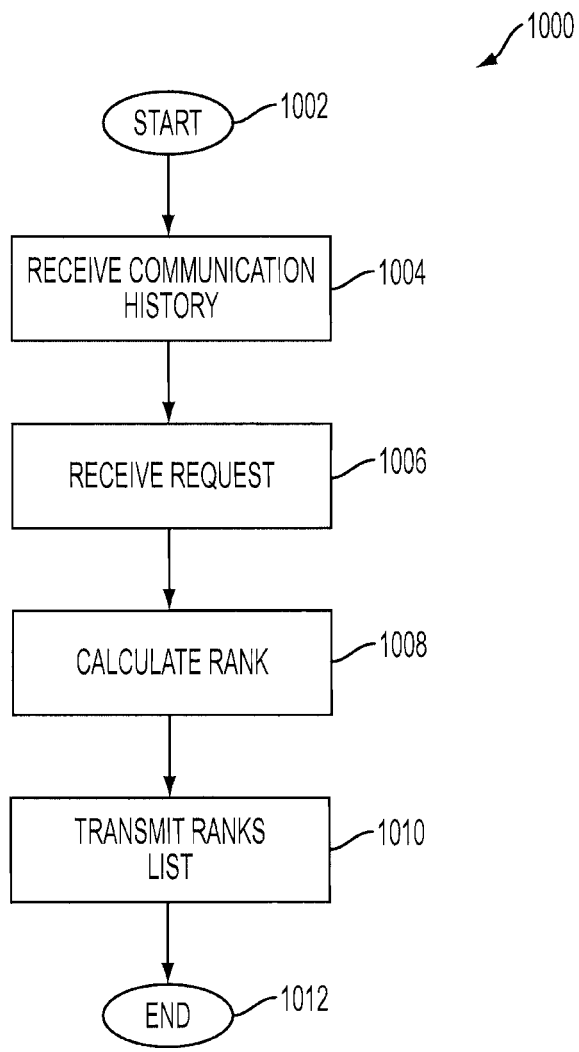
FIG. 10 is a flowchart of a method according to an exemplary embodiment of the present invention.

According to an exemplary embodiment, a method 1000 for providing a ranked list of a plurality of contacts is illustrated in FIG. 10. In operation 1002, the method 1000 may begin. In operation 1004, aggregated communication history data associated with each of said plurality of contacts may be received. The aggregated communication history data for each contact may include data from different communication services for each contact. In operation 1006, a request for a ranked list may be received. The request may include contextual data. In operation 1008, a rank for each contact based on the contextual data and the aggregated communication history data may be calculated. In operation 1010, the ranked list may be transmitted toward a requestor. In operation 1012, the method 1000 may end.

Figure 11:
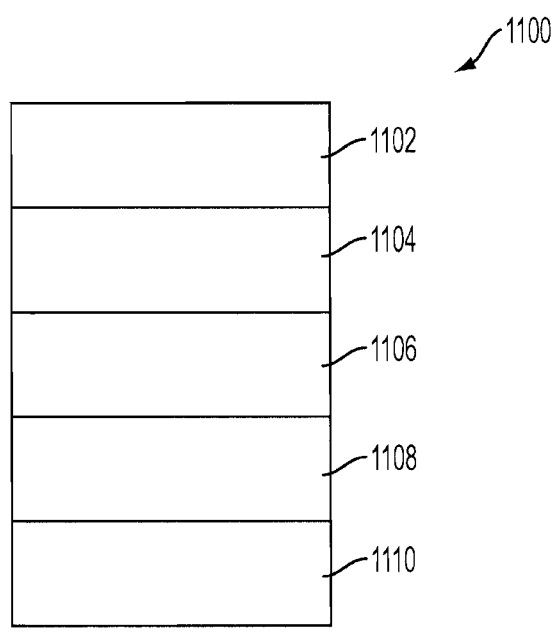
FIG. 11 is a schematic representation of a data structure according to an embodiment of the present invention.

According to an exemplary embodiment, a data structure 1100 stored in a computer memory or on a computer readable storage is illustrated in FIG. 11. The data structure 1100 may include a first field 1102 comprising a user identifier. The data structure 1100 may include a second field 1104 comprising a first contact identifier of a first contact of the user, the first contact being from a first communication service. The data structure 1100 may include a third field 1106 comprising a second contact identifier of a second contact of the user, the second contact being from a second communication service. The data structure 1100 may include a fourth field 1108 comprising a ranking of a strength of a connection between the first contact of the user and the user. The data structure 1100 may include a fifth field 1110 comprising a ranking of a strength of a connection between the second contact of the user and the user.

The foregoing description of exemplary embodiments provides illustration and description, but it is not intended to be exhaustive or to limit the invention to the precise form disclosed. Modifications and variations are possible in light of the above teachings or may be acquired from practice of the invention.

The invention claimed is:

1. A method for providing a ranked list of a plurality of contacts based upon aggregated communication history data and contextual data, said method comprising:
receiving aggregated communication history data associated with each of said plurality of contacts, wherein said aggregated communication history data for at least some of said plurality of contacts includes data from different communication services;
receiving a request for said ranked list, said request including contextual data;
calculating a rank for each contact based on the contextual data and that contact's aggregated communication history data; and
transmitting said ranked list toward a requestor,
wherein said step of calculating the rank comprises measuring a Euclidean distance between each contact and a particular user associated with said request, and
wherein the calculating of the rank is calculated according to the algorithm:

$$\begin{aligned}
&\text{Require:} \quad f_{i,j,k} \text{ and } C_k \\
&\text{Ensure:} \quad k = 1 \ldots n \\
&\quad \text{while } k \neq n \quad \text{do} \\
&\quad sk = \sum_{i=1}^{p} thres_i \; s_{i,k} \\
&\quad = \sum_{i=1}^{p} t_i \sum_{j=1}^{q} \frac{f_{i,j,k} thres_{i,j}}{\sum_{k=1}^{n} f_{i,j,k}} \\
&\text{end while,}
\end{aligned}$$

wherein f is a frequency, i is a communication service, j is a communication tool, k is a contact, C is a set of contact individuals, n is a number of contact individuals, S is a set of communication services $thres_{i,j}$ is a threshold value of tool communication tool j in communication service i, and $thres_i$ is a threshold value estimated over usage on communication service i.

2. A method for providing a ranked list of a plurality of contacts, comprising:
receiving communication history data associated with each of said plurality of contacts, wherein said communication history data for at least one of said plurality of contacts includes data from more than one communication service;
receiving a request for said ranked list;
calculating a rank for each of said plurality of contacts based on the request and the communication history data; and
transmitting said ranked list toward a requestor,
wherein said step of calculating the rank comprises measuring a Euclidean distance between each contact and a particular user associated with said request, and wherein the calculating of the rank is calculated according to the algorithm:

$$\begin{aligned}
&\text{Require:} \quad f_{i,j,k} \text{ and } C_k \\
&\text{Ensure:} \quad k = 1 \ldots n \\
&\quad \text{while } k \neq n \quad \text{do} \\
&\quad sk = \sum_{i=1}^{p} thres_i \; s_{i,k} \\
&\quad = \sum_{i=1}^{p} t_i \sum_{j=1}^{q} \frac{f_{i,j,k} thres_{i,j}}{\sum_{k=1}^{n} f_{i,j,k}} \\
&\text{end while,}
\end{aligned}$$

wherein f is a frequency, i is a communication service, j is a communication tool, k is a contact, C is a set of contact individuals, n is a number of contact individuals, S is a set of communication services $thres_{i,j}$ is a threshold value of tool communication tool j in communication service i, and $thres_i$ is a threshold value estimated over usage on communication service i.

3. The method of claim 2, wherein the request includes contextual data, wherein the contextual data is used when calculating the rank for each contact.

4. The method of claim 3, wherein calendar data is included in said communication history data.

5. The method of claim 3, wherein the rank for each contact based on the contextual data and the communication history data is ranked relative to a particular user.

6. The method of claim 3, wherein the rank for each contact based on the contextual data and the communication history data is calculated using a social strength metric.

7. The method of claim 6, wherein the social strength metric comprises one or more members of the group consisting of frequency of communication, form of communication, contact lists, and context.

8. The method of claim 3, wherein the calculating of the rank for each contact based on the contextual data and the communication history data comprises:
   calculating a first social strength measure on the basis of a first communication service of the more than one communication service for said at least one of said plurality of contacts; and
   calculating a second social strength measure on the basis of all of the more than one communication services for said at least one of said plurality of contacts.

9. The method of claim 8, wherein the calculating of the second social strength measure comprises considering a frequency of usage of each of the more than one communication services for said at least one of said plurality of contact.

10. The method of claim 2, wherein said request for said ranked list is a contacts recommendation request.

11. The method of claim 2, wherein said request for said ranked list is a presence information request.

12. The method of claim 2, wherein said request for said ranked list is a content or messages prioritizing request.

13. The method of claim 2, wherein said request for said ranked list is a filtering decisions request.

14. The method of claim 2, wherein said request for said ranked list is received from a web application.

15. The method of claim 2, further comprising transmitting said rank for each contact toward the requestor.

16. The method of claim 2, wherein said data from said more than one communication service for said at least one of said plurality of contacts comprises data from different social networks, and wherein data from each social network comprises data from multiple communication tools.

17. The method of claim 2, wherein the measuring of the Euclidean distance is calculated according to the algorithm $$\text{Require:} \quad f_{i,j,k} \text{ and } C_k$$
$$\text{Ensure:} \quad k = 1 \ldots n$$
$$\text{while } k \neq n \quad \text{do}$$

$$d_{U,k} = \sqrt{\sum_{j=1}^{r} (f_{j,U} - f_{j,k})^2}$$

$$sk = \frac{1}{1 + d_{U,k}}.$$

end while, wherein r is a radius, f is a frequency, i is a communication service, j is a communication tool, k is a contact, C is a set of contact individuals, U is a user, n is a number of contact individuals, S is a set of communication services, and $d_{U,k}$ is the distance from U to k.

18. A system, comprising:
   a communication history aggregator configured to aggregate communication history data associated with a plurality of contacts, wherein said aggregated communication history data for at least one of said plurality of contacts includes data from a plurality of different communication services;
   an aggregated social graph service configured to receive a request for a ranked list; and
   a social ranker configured to calculate a rank of each contact after receipt of the request for the ranked list by the aggregated social graph service, said rank being based on the request and the aggregated communication history data,
   wherein said ranked list is transmitted toward a requestor,
   further wherein the system comprises a computing device including one or more processors,
   wherein the social ranker is configured to calculate the rank for each contact by measuring a Euclidean distance between each contact and a particular user associated with said request, and
   wherein the social ranker is configured to calculate the rank according to the algorithm $$\text{Require:} \quad f_{i,j,k} \text{ and } C_k$$
$$\text{Ensure:} \quad k = 1 \ldots n$$
$$\text{while } k \neq n \quad \text{do}$$

$$sk = \sum_{i=1}^{p} thres_i \, s_{i,k}$$

$$= \sum_{i=1}^{p} t_i \sum_{j=1}^{q} \frac{f_{i,j,k}^{thres_{i,j}}}{\sum_{k=1}^{n} f_{i,j,k}}$$

end while, wherein f is a frequency, i is a communication service, j is a communication tool, k is a contact, C is a set of contact individuals, n is a number of contact individuals, S is a set of communication services $thres_{i,j}$ is a threshold value of tool communication tool j in communication service i, and $thres_i$ is a threshold value estimated over usage on communication service i.

19. The system of claim 18, wherein said request includes contextual data, and said social ranker is further configured to calculate said rank of each contact based on said contextual data.

20. The system of claim 19, wherein the rank for each contact based on the contextual data and the aggregated communication history data is ranked relative to a particular user.

21. The system of claim 18, wherein said request for said ranked list is a contacts recommendation request.

22. The system of claim 18, wherein said rank for each contact is transmitted toward the requestor.

23. The system of claim 18, wherein the social ranker is configured to calculate the rank for each contact using a social strength metric.

24. The system of claim 23, wherein the social strength metric comprises one or more members of the group consisting of frequency of communication, form of communication, contact lists, and context.

25. The system of claim 18, wherein said data from different communication services for said at least one of said plurality of contacts comprises data from different social networks, and wherein data from each social network comprises data from multiple communication tools.

26. The system of claim 18, wherein the social ranker is configured to:
   calculate a first social strength measure on the basis of a first communication service of the different communication services for said at least one of said plurality of contacts; and
   calculate a second social strength measure on the basis of all of the different communication sources for said at least one of said plurality of contacts.

27. The system of claim 26, wherein the social ranker is configured to calculate the second social strength measure considering a frequency of usage of each of the different communication services for said at least one of said plurality of contacts.

28. The system of claim 18, wherein the measuring of the Euclidean distance is calculated according to the algorithm Require: $f_{i,j,k}$ and $C_k$
Ensure: $k = 1 \ldots n$
while $k \neq n$ do $$d_{U,k} = \sqrt{\sum_{j=1}^{r} (f_{j,U} - f_{j,k})^2}$$

$$sk = \frac{1}{1 + d_{U,k}}$$

end while, wherein r is a radius, f is a frequency, i is a communication service, j is a communication tool, k is a contact, C is a set of contact individuals, U is a user, n is a number of contact individuals, S is a set of communication services, and $d_{uk}$ is the distance from U to k.

* * * * *

UNITED STATES PATENT AND TRADEMARK OFFICE
CERTIFICATE OF CORRECTION

| | |
|---|---|
| PATENT NO. | : 8,943,053 B2 |
| APPLICATION NO. | : 12/979493 |
| DATED | : January 27, 2015 |
| INVENTOR(S) | : Kristiansson et al. |

It is certified that error appears in the above-identified patent and that said Letters Patent is hereby corrected as shown below:

On The Title Page, item (75)

Under "Inventors", in Column 1, Line 1, delete "Lule" and insert -- Luleå --, therefor.

Under "Inventors", in Column 1, Line 2, delete "Lule" and insert -- Luleå --, therefor.

Under "Inventors", in Column 1, Line 3, delete "Lule" and insert -- Luleå --, therefor.

Under "Inventors", in Column 1, Line 3, delete "K re Synnes," and insert -- Kåre Synnes, --, therefor.

Under "Inventors", in Column 1, Line 4, delete "Stefan H kansson, Lule" and insert -- Stefan Håkansson, Luleå --, therefor.

Page 1 of 1

Signed and Sealed this
Seventh Day of July, 2015

Michelle K. Lee
*Director of the United States Patent and Trademark Office*